United States Patent
Matsubara et al.

(10) Patent No.: US 10,915,362 B2
(45) Date of Patent: Feb. 9, 2021

(54) TASK MANAGEMENT SYSTEM, TASK MANAGEMENT METHOD, AND TASK MANAGEMENT PROGRAM

(71) Applicant: HITACHI, LTD., Tokyo (JP)

(72) Inventors: Kazumasa Matsubara, Tokyo (JP); Mitsuo Hayasaka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 241 days.

(21) Appl. No.: 16/180,866

(22) Filed: Nov. 5, 2018

(65) Prior Publication Data

US 2019/0138358 A1    May 9, 2019

(30) Foreign Application Priority Data

Nov. 7, 2017 (JP) ................................. 2017-214872

(51) Int. Cl.
*G06F 9/46* (2006.01)
*G06F 9/50* (2006.01)

(52) U.S. Cl.
CPC .......... *G06F 9/5016* (2013.01); *G06F 9/5038* (2013.01); *G06F 9/5083* (2013.01)

(58) Field of Classification Search
None
See application file for complete search history.

(56) References Cited

U.S. PATENT DOCUMENTS

| | | | |
|---|---|---|---|
| 2009/0007127 A1* | 1/2009 | Roberts | G06F 9/526 718/104 |
| 2013/0226639 A1* | 8/2013 | Yokoyama | G06Q 10/06 705/7.14 |
| 2014/0372611 A1 | 12/2014 | Matsuda et al. | |
| 2016/0006630 A1* | 1/2016 | Ichikawa | H04L 41/0859 709/224 |
| 2016/0132355 A1* | 5/2016 | Campbell | G06F 9/544 718/103 |
| 2016/0179581 A1* | 6/2016 | Soundararajan | G06F 9/5033 718/104 |
| 2016/0188373 A1* | 6/2016 | Tameshige | G06F 9/5038 718/103 |

* cited by examiner

*Primary Examiner* — Kenneth Tang
(74) *Attorney, Agent, or Firm* — Volpe Koenig (57) ABSTRACT

A computer system includes a plurality of task processing nodes capable of executing tasks and a task management node which determines which a task processing node to allocate a new task and each task processing nodes includes a memory capable of caching data to be used by an allocation task which is a task allocated to the task processing node. The task management node stores task allocation history information including a correspondence relationship between the allocation task and the respective task processing node A CPU of the task management node determines a degree of similarity between the new task and the allocated task, determines the task processing node to which the new task should be allocated from the task processing nodes included in the task allocation history information based on the degree of similarity, and allocates the new task.

12 Claims, 8 Drawing Sheets

| TASK | EXECUTION NODE ID | ANALYSIS RESULT | PROCESSING STATE | COMPARISON COUNT (=NUMBER OF COMPARISON TIMES) | AVERAGE SIMILARITY RATE | ADOPTION NUMBER | LAST EXECUTION DATE AND TIME |
|---|---|---|---|---|---|---|---|
| A | 1 | $V_A$ | PROCESSED | 6 | 51.2% | 3 | YYMMDD hh:mm:ss |
| B | 1 | $V_B$ | PROCESSED | 3 | 9.7% | 0 | YYMMDD hh:mm:ss |
| C | 1 | $V_C$ | BEING PROCESSED | 2 | 35.8% | 0 | YYMMDD hh:mm:ss |
| D | 1 | $V_D$ | BEING PROCESSED | 1 | 50.9% | 1 | YYMMDD hh:mm:ss |
| X | 2 | $V_X$ | PROCESSED | 5 | 34.5% | 1 | YYMMDD hh:mm:ss |
| Y | 2 | $V_Y$ | BEING PROCESSED | 4 | 36.6% | 0 | YYMMDD hh:mm:ss |

| NODE ID | CACHE CAPACITY | USED CACHE CAPACITY | DATA DELETION THRESHOLD | CACHE ARRANGEMENT METHOD | CACHED TASK | CACHE DATA LIST |
|---|---|---|---|---|---|---|
| 1 | 4 GB | 3.4 GB | 3G | LOW DEGREE OF SIMILARITY TASK | A | DA1, DA2, DA3 |
| | | | | | B | DB1, DB2, DA3 |
| | | | | | C | DC1, DA2, DA3 |
| | | | | | D | DA1, DA2, DD3 |

TASK MANAGEMENT SYSTEM, TASK MANAGEMENT METHOD, AND TASK MANAGEMENT PROGRAM

TECHNICAL FIELD

The present invention relates to a task management system and the like for determining a node to which a task is allocated from among a plurality of nodes.

BACKGROUND ART

Currently, markets providing a determination support service utilizing artificial intelligence (AI) are expanding. In the service utilizing a natural language processing system AI, distributed management and distributed processing of data by the plurality of nodes are performed in order to handle large volume text data.

In recent years, when tasks are subjected to the distributed processing for the purpose of AI processing, a method of distributing and managing large volume data among a plurality of nodes is used. In a case of using this method, there is a problem that when a task is processed, it is necessary to acquire data necessary for the task from the node which is subjected to the distributed management, and communication between the nodes increases as the number of data necessary for the task increases, communication is bottlenecked, and a processing speed decreases.

In contrast, in order to speedup the processing, a method in which tasks are disposed in a node which processes the task and which is close to a node where data used by the task is stored most, and inter-node communication at the time of data acquisition is reduced is used. For example, Patent Document 1 discloses a technology for determining a node to which a task is allocated by using an actual distance between nodes.

CITATION LIST

Patent Literature

PTL 1: US-A-2014/0372611

SUMMARY OF INVENTION

Technical Problem

As described above, in a case where data is distributed and managed among a plurality of nodes and distributed processing is performed with the plurality of nodes, it is demanded to reduce the amount of data between the nodes.

For example, in the technology of Patent Document 1, it is necessary to perform processing for investigating data to be used by a task in order to determine a node with the most data to be used by the task. Furthermore, as data to be used increases, the time it takes to calculate the node to which the task is to be allocated increases. For that reason, inter-node communication for acquiring data frequently occurs, which results in degraded performance.

The present invention has been made in view of the above circumstances, and an object thereof is to provide a technology capable of reducing the amount of data communication between nodes.

Solution to Problem

In order to achieve the object described above, a task management system according to one aspect is a task management system which includes a plurality of task processing nodes capable of executing a task and a task management node determining a task processing node to which a new task is to be allocated, and in which each of the plurality of task processing nodes includes a memory capable of caching data to be used by an allocation task which is a task allocated to the task processing node, the task management node stores task allocation information including a correspondence relationship between the allocation task and the task processing node to which the allocation task is allocated and in which data to be used by the allocation task is cached, and a processor of the task management node determines a degree of similarity between the new task and the allocation task, determines a task processing node to which the new task is to be allocated from among the task processing nodes included in the task allocation information based on the degree of similarity, and allocates the new task to the determined task processing node.

Advantageous Effects of Invention

According to the present invention, it is possible to reduce the amount of data communication between nodes.

DESCRIPTION OF EMBODIMENTS

Embodiments will be described with reference to the drawings. The embodiments described below do not limit the inventions according to the claims, and all the elements and combinations thereof described in the embodiments are not necessarily essential to the solution means of the invention.

In the following description, although information according to the embodiments will be described by representing the embodiments by a data structure by, for example, a table, but these pieces of information do not necessarily have to be represented by a data structure by the table, and may be represented by a "list", a "database (DB)", a "queue", and the like, and others. For that reason, the "table", "list", "DB", "queue", and the like can be simply referred to as "information" in order to indicate that the embodiments are not dependent on the data structure. When describing the content of each piece of information, representations such as "identification information", "identifier", "title", "name", "ID", and "number", can be used and these can be replaced with each other.

In the following description, although description will be made by using a "program" (for example, program module) as an operation entity, since the program executes processing defined by being executed by the processor while using a memory and a communication port (communication control device), description in which a processor is used as the operation entity may be made, or description in which a controller is used as the operation entity may be made.

Processing disclosed for which a program is used as the operation entity may be processing performed by a computer (computer, information processing apparatus) such as a node. A part or all of the program may be realized by dedicated hardware. Various programs may be installed in each node by a program distribution server or a storage medium (for example, a nonvolatile recording medium).

First, an outline of a computer system according to a first embodiment will be described.

The computer system according to the first embodiment includes a task management node 100 (see FIG. 1) that retrieves a similar task and performs allocating of a task and a plurality of task processing nodes 200 (see FIG. 2) that execute task processing and managing data necessary for the task processing.

The task management node receives a task processing request, analyzes contents of the task, performs a similarity search with history information of the task, and executes processing for determining a task processing node to which the task to be allocated based on a similarity rate between tasks. The task processing node processes the allocated task and executes processing for managing a cache of data to be used for the task.

Next, the computer system according to the first embodiment will be described in detail.

Figure 1:
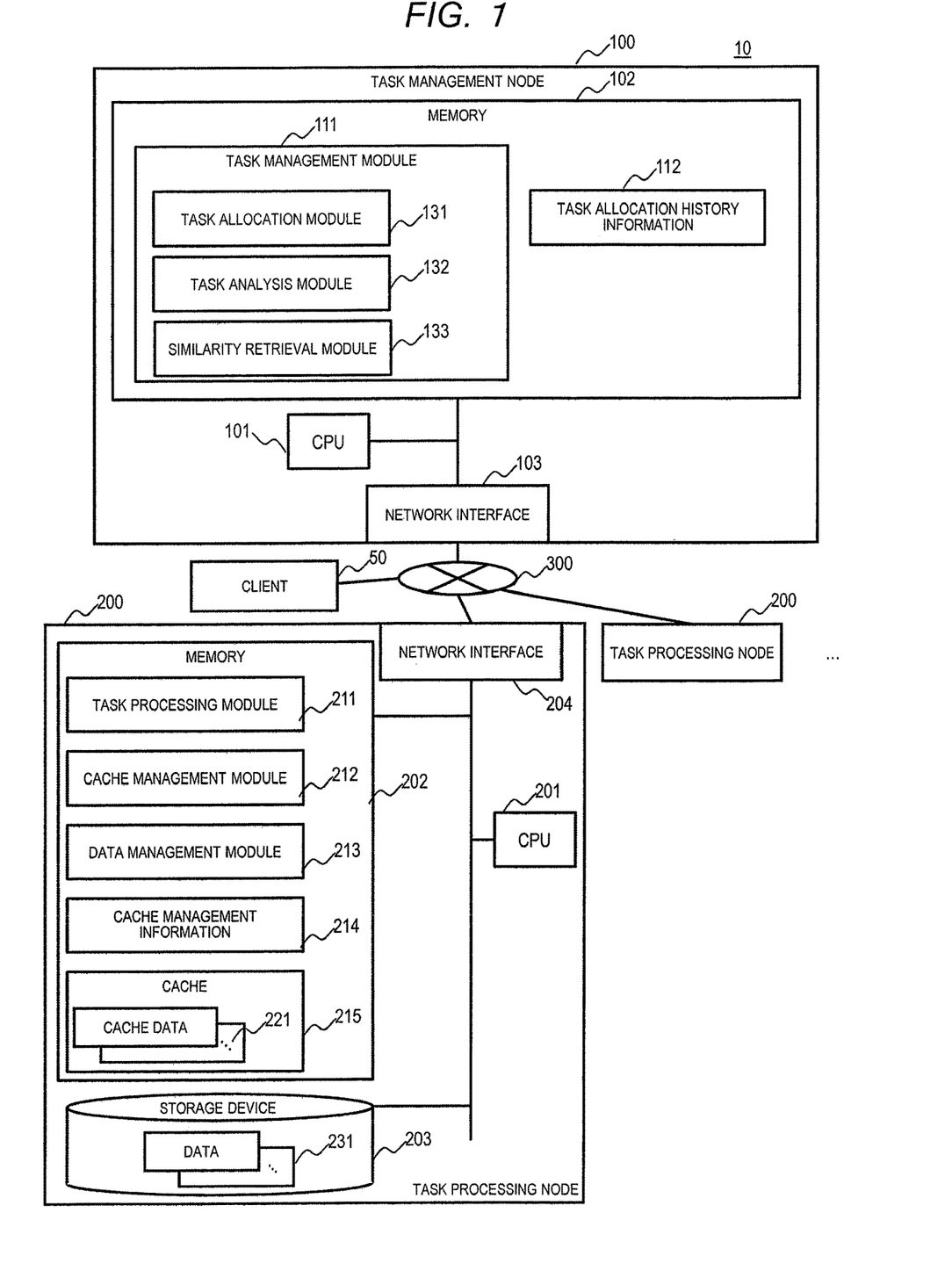
FIG. 1 is an overall configuration diagram of a computer system according to a first embodiment.

FIG. 1 is an overall configuration diagram of a computer system according to the first embodiment.

A computer system 10 as an example of a task management system includes a client 50, the task management node 100, and the plurality of task processing nodes 200. The client 50, the task management node 100, and the task processing node 200 are connected via a network 300. The network 300 may be, for example, a wired local area network (LAN), a wireless LAN, a wide area network (WAN), or a combination thereof.

The client 50 is configured by, for example, a personal computer (PC) and is used by a user who requests execution of a task. For example, the client 50 transmits a task processing request from the user to the task management node 100, receives a task processing result from the task management node 100, and displays the result on a display or the like, for example.

The task management node 100 is configured by, for example, a computer such as a server, and includes a central processing unit (CPU) 101 as an example of a processor, a memory 102, and a network interface 103.

The network interface 103 is, for example, an interface such as a wired LAN card or a wireless LAN card, and communicates with another device (for example, the client 50, the task processing node 200, and the like) via the network 300.

The CPU 101 executes various processing by executing a program (module) stored in the memory 102.

The memory 102 is, for example, a random access memory (RAM), and stores a program executed by the CPU 101 and necessary information.

The memory 102 stores a task management module 111 as an example of a program and task allocation history information 112 as an example of task allocation information.

The task management module 111 includes a task allocation module 131, a task analysis module 132, and a similarity retrieval module 133. The task allocation module 131 is a program module that causes the CPU 101 to execute processing relating to reception of tasks and allocation of tasks. The task analysis module 132 is a program module that causes the CPU 101 to execute processing such as analysis of the task content and digitization of the task. The similarity retrieval module 133 is a program module that causes the CPU 101 to execute processing of comparing information of a new task that has been digitized with information of the task already allocated and evaluating the similarity rate. Details of processing by these modules will be described later.

The task allocation history information 112 is information on history relating to task allocation. Details of the task allocation history information 112 will be described later.

The task processing node 200 is configured by, for example, a computer such as a server, and includes a CPU 201 as an example of a processor, a memory 202, a storage device 203, and a network interface 204.

The network interface 204 is, for example, an interface such as a wired LAN card or a wireless LAN card, and communicates with another device (for example, the client 50, the task management node 100, the other task processing node 200, and the like) via the network 300.

The CPU 201 executes various processing by executing a program (module) stored in the memory 202.

The memory 202 is, for example, a RAM, and stores a program executed by the CPU 201 and necessary information.

The memory 202 stores a task processing module 211, a cache management module 212, a data management module 213, and cache management information 214.

The task processing module 211 is a program module that causes the CPU 201 to execute the task received from the task management node 100 and causes the task management node 100 to execute processing for notifying a result and completion notification of a task. The task processing module 211 may cause the CPU 201 to execute natural language processing by AI as task processing. The cache management module 212 is a program module that causes the CPU 201 to execute processing (in-cache arrangement processing) for managing data cached in a cache 215 when processing a task and performing arrangement when the cache 215 is in the capacity shortage. The data management module 213 is a program module that causes the CPU 201 to manage an arrangement state of data 231 in the storage device 203 of the plurality of task processing nodes 200. By executing the data management module 213 by the CPU 201, the data 231 in the storage device 203 can be managed separately or distributed by the storage device 203 of the plurality of task processing nodes 200.

The cache management information 214 is information on a cache status in the cache 215 and a list of data used by the task. Details of the cache management information 214 will be described later.

Further, the memory 202 includes the cache 215, which is an area for storing data (cache data) 221 acquired from its own task processing node 200 or the storage device 203 of another task processing node 200 for use in task processing. The capacity of the cache 215 is preset to a predetermined capacity. The cache data 221 is maintained in a state of being held in the cache 215 until the cache data 221 is deleted from the cache 215 by the cache management module 212.

The storage device 203 is, for example, a hard disk, a flash memory, or the like, and stores programs executed by the CPU 201 and data used by the CPU 201. In the present embodiment, the storage device 203 stores data 231 used in task processing.

Next, the task allocation history information 112 will be described.

Figure 2:
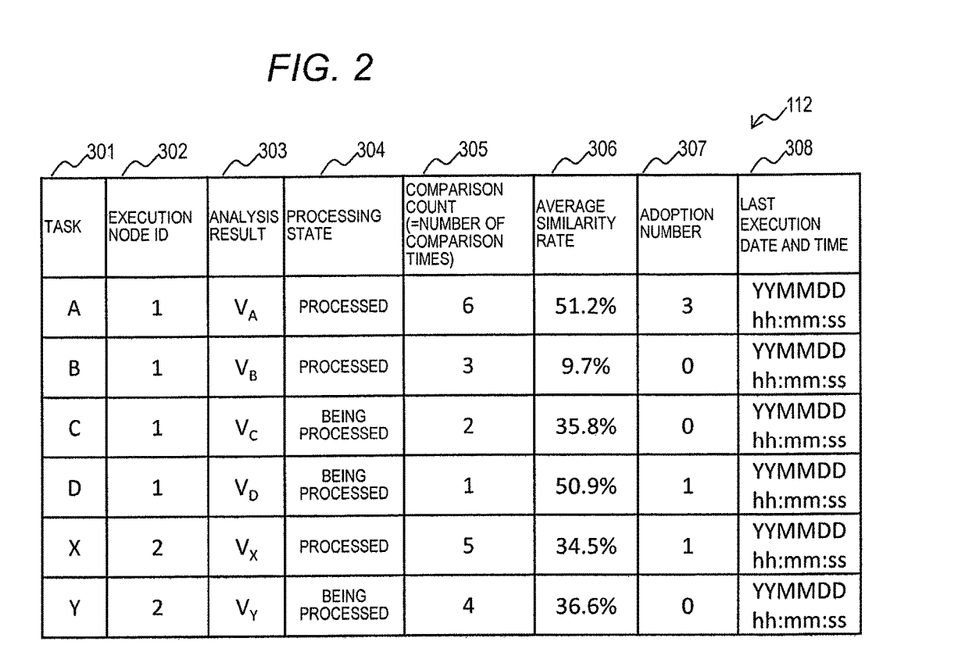
FIG. 2 is a diagram illustrating a configuration of task allocation history information according to the first embodiment.

FIG. 2 is a diagram illustrating a configuration of task allocation history information according to the first embodiment.

The task allocation history information 112 stores an entry corresponding to each task whose data used in the task is cached in the task processing node 200. The entry of the task allocation history information 112 includes fields for a task 301, an execution node ID 302, an analysis result 303, a processing state 304, a comparison count 305, an average similarity rate 306, an adoption number 307, and a last execution date and time 308.

In the task 301, an identifier (task ID) of a task (allocation task) allocated to the task processing node 200 is stored. In the present embodiment, in the task 301, the task ID of the task for which a state, in which data used in the task is cached in the cache 215 of the task processing node 200 is maintained, is stored. In the execution node ID 302, an identifier (execution node ID) of a node (task processing node 200) to which a task corresponding to the entry is allocated is stored. In the analysis result 303, the result of analyzing the task (content of the task) corresponding to the entry by the task analysis module 132 is stored. For example, for the task of the natural language processing system, the analysis result 303 stores the result of digitizing (vectorizing) sentences and words of task contents. In the processing state 304, information as to whether the task corresponding to the entry is being processed or processed is stored. In the comparison count 305, the number of times the similarity retrieval module 133 compares a newly requested task (new task) with a task (allocation task) corresponding to the entry is stored. In the average similarity rate 306, the average (average similarity rate) up to now for the result (similarity rate: one example of the degree of similarity) obtained by comparing the new task and the allocation task by the similarity retrieval module 133 is obtained. In the adoption number 307, in order to determine the task processing node 200 to which the task is allocated by the task allocation module 131, the number of times (adoption times) the task processing node 200 which corresponds to this entry, that is, which is caused by this entry, is determined to be a new task allocation destination. In the final execution date and time 308, the last date (for example, YYMMDD hh:mm:ss) at which the task corresponding to the entry was executed is stored.

Next, the cache management information 214 will be described.

Figure 3:
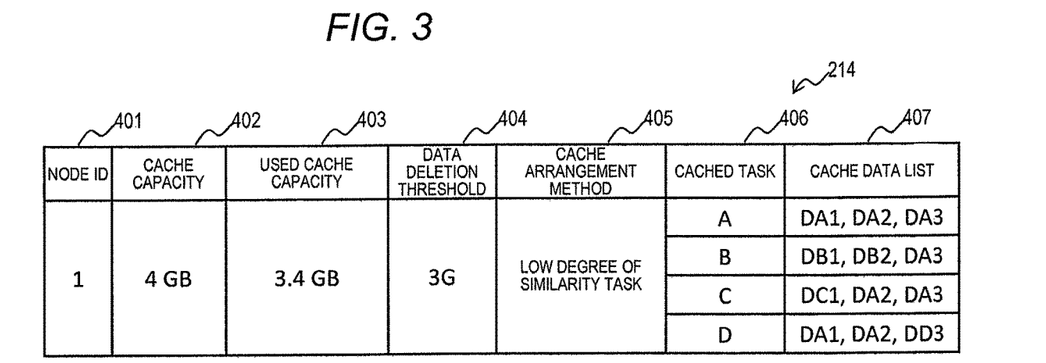
FIG. 3 is a diagram illustrating a configuration of cache management information according to the first embodiment.

FIG. 3 is a diagram illustrating a configuration of cache management information according to the first embodiment.

The cache management information 214 holds entries corresponding to the task processing node 200. The entry of the cache management information 214 has fields for a node ID 401, a cache capacity 402, a used cache capacity 403, a data deletion threshold 404, a cache arrangement method 405, a cached task 406, and a cache data list 407.

In the node ID 401, a unique identifier (node ID) for identifying the task processing node 200 is stored. In a case where the cache management information 214 manages only information on the task processing node 200 in which the cache management information 214 itself is stored, the node ID 401 may not be provided. In the cache capacity 402, the storage capacity of the memory 202 usable as the cache 215 of the task processing node 200 corresponding to the entry is stored. In the used cache capacity 403, the total capacity of the cache data 221 cached in the cache 215 of the task processing node 200 corresponding to the entry is stored. In the data deletion threshold 404, a threshold relating to the capacity to be used for determining whether to delete data in the cache 215 is stored. In the cache arrangement method 405, information indicating a method of arranging cache data when the cache capacity of the cache 215 becomes insufficient is stored. In the cached task 406, an identifier of a task in which data to be used in the cache 215 of the task processing node 200 corresponding to the entry is cached is stored. The cached task 406 may store identifiers for a plurality of tasks. In the cache data list 407, a list of identifiers of the cache data 221 cached in the cache 215 within data used or being used by the task corresponding to the task identifier of the cached task 406 is held.

Next, a processing operation in the computer system 10 will be described.

First, task management processing by the task management node 100 will be described.

Figure 4:
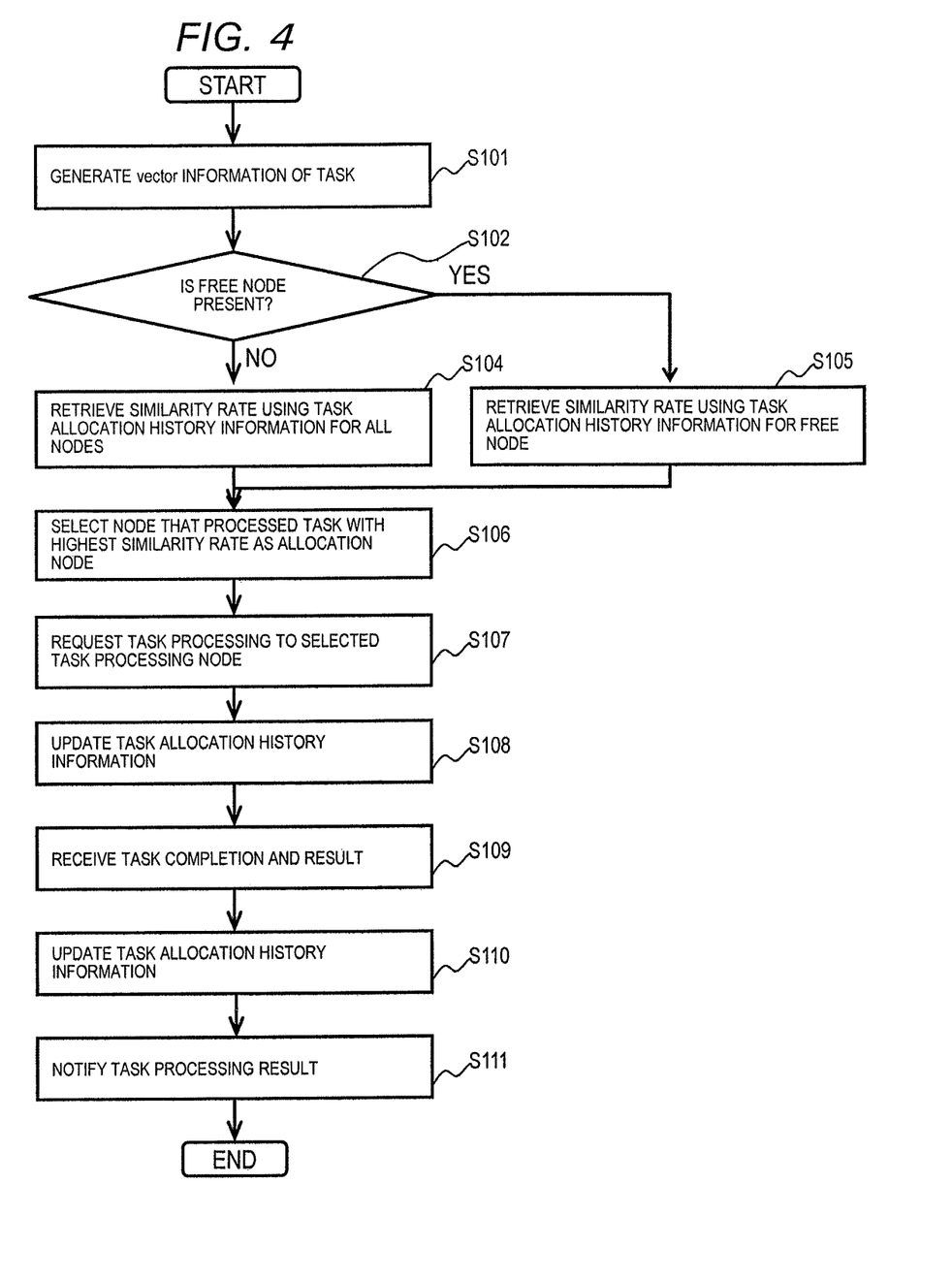
FIG. 4 is a flowchart of task management processing according to the first embodiment.

FIG. 4 is a flowchart of task management processing according to the first embodiment.

The task management processing is started when the task management node 100 receives a task execution request from the client 50. In the present embodiment, a case where a task (new task) as a target of a task execution request is a natural language processing task will be described as an example. A task type is not limited to the natural language processing task.

The task management module 111 (to be precise, the CPU 101 executing the task management module 111) causes the task analysis module 132 to analyze the new task included in the task processing request received from the client 50, thereby causing the task (content of the task) to be analyzed (Step S101). Specifically, the task analysis module 132 converts (digitizes) a word (sentence or word) of the task into vector information. As a method of converting a word into vector information, for example, a known technique such as word2vec can be used.

Next, the task management module 111 refers to the processing state 304 of each entry of the task allocation history information 112 to determine whether or not a task processing node 200 (free node) is present which is not currently processing the task (Step S102).

As a result, in a case where it is determined that a free node is not present (NO in Step S102), the task management module 111 causes the similarity retrieval module 133 to calculate the similarity rate with the new task for all the tasks having entries in the task allocation history information 112 (Step S104), and causes processing to proceed to) Step S106. Here, based on vector information of the calculated new task and information of the analysis result 303 of the entries of all the tasks in the task allocation history information 112, the similarity retrieval module 133 calculates the similarity rate between the new task and the allocation task.

On the other hand, in a case where it is determined that a free node is present (YES in Step S102), the task management module 111 causes the similarity retrieval module 133 to calculate the similarity rate with the new task for all the free nodes (Step S105), causes the processing to proceed to Step S106.

In Step S106, based on the similarity rate calculated by the similarity retrieval module 133, the task management module 111 selects the task processing node 200 having the task with the highest similarity rate as a node (allocation destination node) of the allocation destination of the new task.

Here, the task having the highest similarity rate to the new task has a high possibility of using the same data as the data used in the new task, and there is a high possibility that the data is cached. Accordingly, when it is assumed that the task processing node 200 having the task with the highest similarity rate is the allocation destination node of the new task, a possibility (that is, cache hit ratio) of using the cached data becomes high. Although the possibility that the same data is used by the task having the highest degree of similarity to the new task differs depending on the type of the task, for example, if the task is a task relating to natural language processing, it can be said that the possibility of using the same data tends to be higher.

Next, the task allocation module 131 requests the task processing node 200 selected as the allocation destination node for task processing, that is, sends the new task (Step S107). With this, in the task processing node 200 of the allocation destination node, processing of the task is executed and the processing result of the task and the task completion notification are transmitted to the task management node 100 in a case where the task processing is ended.

Next, the task management module 111 updates the task allocation history information 112 (Step S108). Specifically, the task management module 111 adds an entry corresponding to the new task to the task allocation history information 112, sets an identifier of the new task in the task 301, sets the identifier of the allocation destination node in the execution node ID 302, sets the vector information obtained in Step S101 in the analysis result 303, sets processing during the process indicating that the task is being executed in the processing state 304, stores the number of times of comparison with the allocation task (the number of times of calculating similarity rate) in the comparison count 305, stores the average similarity rate with the allocated task compared with the average similarity rate 306, and stores 0 in the adoption number 307. Further, the task management module 111 adds 1 to the number of comparisons of the comparison count 305 of the entry corresponding to the allocation task to which comparison has been made, and stores the latest average similarity rate calculated based on the number of comparisons, the average similarity degree before update, and the calculated similarity rate in the average similarity rate 306. In addition, the task management module 111 adds 1 to the adoption number 307 of the entry corresponding to the task processing node 200 selected as the allocation destination node.

Thereafter, the task management module 111 receives the task completion notification and the task processing result from the task processing node 200 (S109), and updates the processing state 304 of the entry of the task allocation history information 112 corresponding to the task whose task completion notification has been made to processed (S110), and notifies the task processing result to the client 50 of the request source of the task processing request (S111).

Next, task execution processing by the task processing node 200 will be described.

Figure 5:
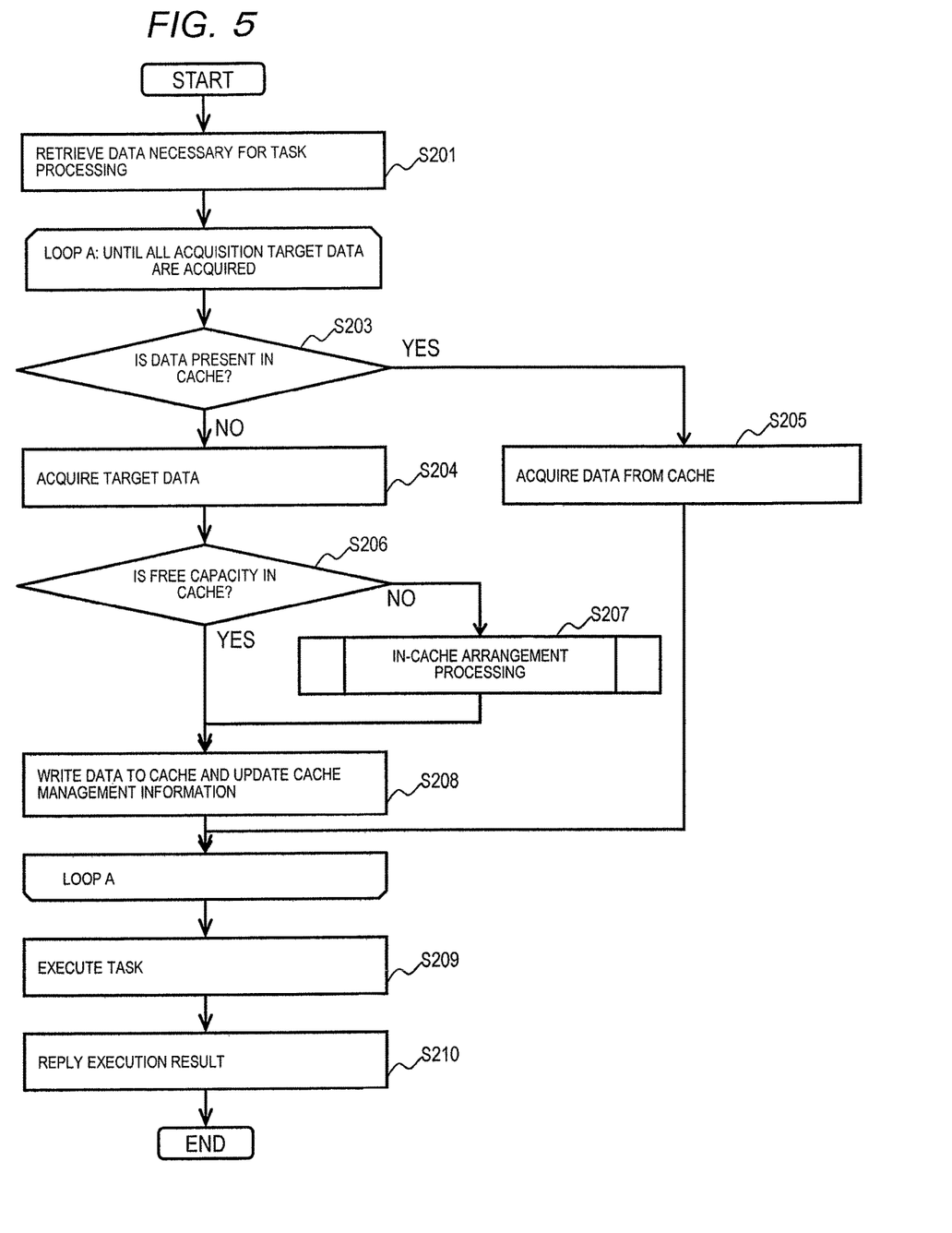
FIG. 5 is a flowchart of task execution processing according to the first embodiment.

FIG. 5 is a flowchart of task execution processing according to the first embodiment.

The task execution processing is started in a case where the task processing node 200 receives a new task from the task management node 100.

When the task execution processing is started, the task processing module 211 of the task processing node 200 analyzes the task and examines data (acquisition target data) necessary for task processing (S201).

Next, the task processing module 211 repeatedly executes processing of the loop A (steps S203 to S208) with each of the acquisition target data as a processing target.

In the loop A, the task processing module 211 inquires the cache management module 212 about whether or not acquisition target data to be processed (processing target data) is present in the cache 215 (Step S203). As a result, in a case where it is determined that the data is present in the cache 215 (YES in Step S203), the task processing module 211 acquires the cache data 221 corresponding to the processing target data from the cache 215 via the cache management module 212 (Step S205).

On the other hand, in a case where it is determined that the data is not present in the cache 215 (NO in Step S203), the task processing module 211 acquires data 231 corresponds to the processing target data from any one of the storage devices 203 of all the task processing nodes 200 via the data management module 213 (Step S204).

Next, the task processing module 211 inquires the cache management module 212 about whether or not a free capacity capable of storing the data 231 is present in the cache 215 (Step S206).

As a result, in a case where a free capacity capable of storing the data 231 is not present in the cache 215 (NO in Step S206), the task processing module 211 notifies the cache management module 212 of the cache capacity shortage, and causes the cache management module 212 to perform the in-cache arrangement processing to arrange the cache 215 and increase the free capacity (Step S207). The method of in-cache arrangement processing differs depending on information of the cache arrangement method 405 of the cache management information 214. The in-cache arrangement processing will be described later with reference to FIGS. 6 and 8.

In a case where it is determined that the free capacity is present (YES in Step S206) or after the in-cache arrangement processing is executed (Step S207), the task processing module 211 writes the data 231 to the cache 215 and updates the cache management information 214 (S208). Specifically, the task processing module 211 stores the identifier of the new task in the cached task 406 of the entry corresponding to the task processing node 200 of the cache management information 214, and adds the identifier of the acquired data to the cache data list 407 and changes the used cache capacity 403 to the current capacity at that time.

In a case where processing of the loop A is executed with all acquisition target data as processing targets, the task processing module 211 exits the loop A and executes task processing (Step S209).

In a case where execution of the task processing is ended, the task processing module 211 notifies the task management node 100 of the execution result of the task (Step S210), and ends the processing.

Next, in-cache arrangement processing on a task unit basis in the task processing node 200 will be described. The in-cache arrangement processing on a task unit basis is an example of in-cache arrangement processing in Step S207 in FIG. 5.

Figure 6:
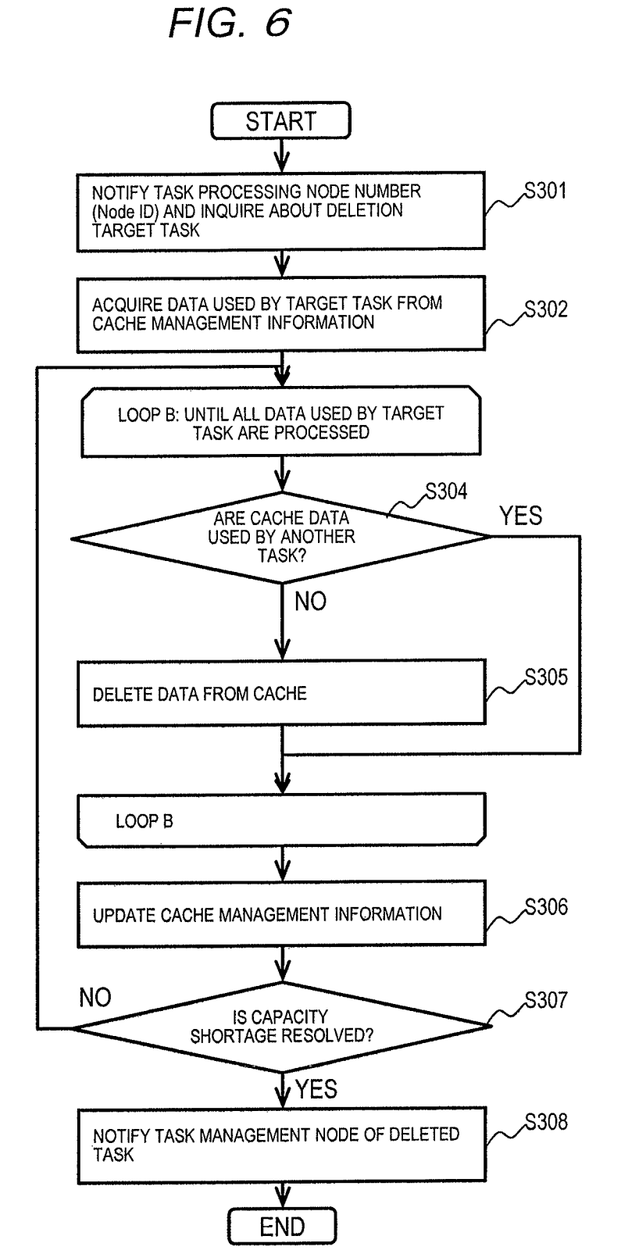
FIG. 6 is a flowchart of in-cache arrangement processing on a task unit basis according to the first embodiment.

FIG. 6 is a flowchart of in-cache arrangement processing on a task unit basis according to the first embodiment.

The in-cache arrangement processing on a task unit basis is started when the cache management module 212 receives a notification of the cache capacity shortage from the task processing module 211.

First, the cache management module 212 notifies the identifier of the task processing node 200 of its own to the task management node 100, and inquires of the task management node 100 the order (priority order of deletion) of the deletion target task (Step S301). With this, the task management node 100 executes deletion target task determination processing (see FIG. 7), and as a result of this processing, the cache management module 212 acquires the order of deletion target tasks.

When orders of the deletion target task are received from the task management node 100, the cache management module 212 sequentially acquires a list of cache data (deletion target cache data) which is a deletion target from the cache data list 407 of the cache management information 214 corresponding to the deletion target task in order from the highest of the orders (S302).

Next, the cache management module 212 executes processing of a loop B (Steps S304 and S305) with each of deletion target cache data corresponding to one deletion target task in accordance with the order as a processing target.

In the loop B, the cache management module 212 refers to information in the cache data list 407 of the cache management information 214 to determine whether or not another task is using the deletion target cache data of the processing target (processing target cache data) (Step S304).

As a result, in a case where it is determined that another task is using the deletion target cache data (YES in Step S304), when the processing target cache data is deleted from the cache 215, it will affect other tasks and thus, the cache management module 212 executes processing of the loop B by using next deletion target cache data as a processing target without deleting the processing target cache data.

On the other hand, in a case where it is determined that no other task is using the deletion target cache data (NO in Step S304), even if the processing target cache data is deleted, there is no influence on execution of other tasks and thus, the cache management module 212 deletes the processing target cache data from the cache 215 (step S305) and executes the processing of the loop B by using next processing target cache data as a processing target.

Then, in a case where the processing of the loop B is executed by using all of the deletion target cache data as the process targets, the cache management module 212 exits the loop B and deletes the cache task 406 and the cache data list 407 corresponding to the deletion target task from the entry of the cache management information 214 (S306).

Next, the cache management module 212 determines whether or not the capacity shortage of the cache 215 has been resolved (Step S307). As a result, in a case where it is determined that the capacity shortage of the cache 215 has not been resolved (NO in Step S307), the cache management module 212 executes the processing of the loop B for the deletion target task in the next order.

On the other hand, in a case where it is determined that the capacity shortage of the cache 215 is solved (YES in Step S307), the cache management module 212 notifies the task management node 100 of the task whose cache data has been deleted (Step S308), and ends the processing.

As described above, according to the in-cache arrangement processing on a task unit basis, the capacity of the cache 215 can be adequately secured. Also, data used in other tasks can be prevented from being deleted from the cache 215.

Next, deletion target task determination processing by the task management node 100 will be described.

Figure 7:
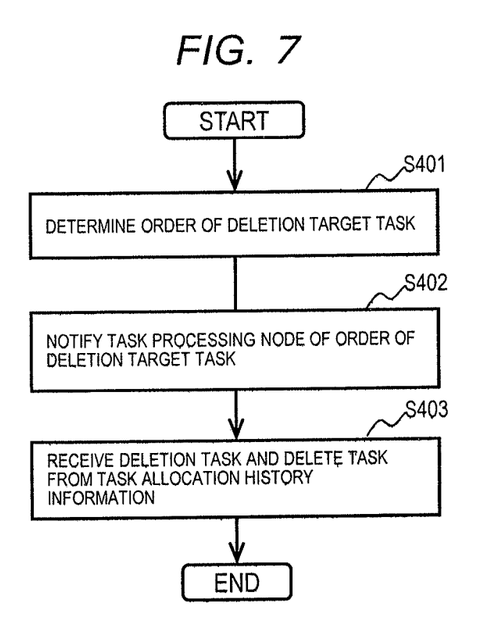
FIG. 7 is a flowchart of deletion target task determination processing according to the first embodiment.

FIG. 7 is a flowchart of deletion target task determination processing according to the first embodiment.

Execution of the deletion target task determination processing is started in a case where an inquiry about the identifier of the task processing node 200 and the order of the deletion target task is received from the task processing node 200.

The task management module 111 determines the order of deletion target tasks (Step S401). Here, as a method of determining the order of the deletion target tasks, for example, at least one of a method of determining based on the number of comparisons of the comparison count 305 of the task allocation history information 112 (for example, a method of making the one having the smaller number of comparisons a higher order, or a method in which the one with the larger number of comparisons is set as a higher order), a method of determining based on the date and time of the last execution date and time 308 of the task allocation history information 112 (a method of making the latest one higher order, or the method of making the oldest one higher order), a method of making a task that has already been executed and whose average similarity rate of the average similarity rate 306 of the task allocation history information 112 is small higher order, and the like may be available.

Next, the task management module 111 notifies the task processing node 200 of the order of the determined deletion target tasks (Step S402).

Next, in a case where notification of the task from which the cache data is deleted is received from the task processing node 200, the task management module 111 deletes the entry of the deleted task from the task allocation history information 112 (Step S403), and ends the deletion target task determination processing.

According to the deletion target task determination processing, the order of the deletion target tasks can be appropriately determined, and the entry for the task whose cache data has been deleted from the cache 215 can be deleted from the task allocation history information 112. Accordingly, in the task allocation history information 112, only an entry for a task in which data used for the cache 215 of the task processing node 200 is cached is present.

Next, the in-cache arrangement processing on a cache data unit basis in the task processing node 200 will be described. The in-cache arrangement processing on a cache data unit basis is an example of the in-cache arrangement processing in Step S207 of FIG. 5. Either one of the in-cache arrangement processing illustrated in FIG. 6 may be executed, or both of the in-cache arrangement processing may be executed.

Figure 8:
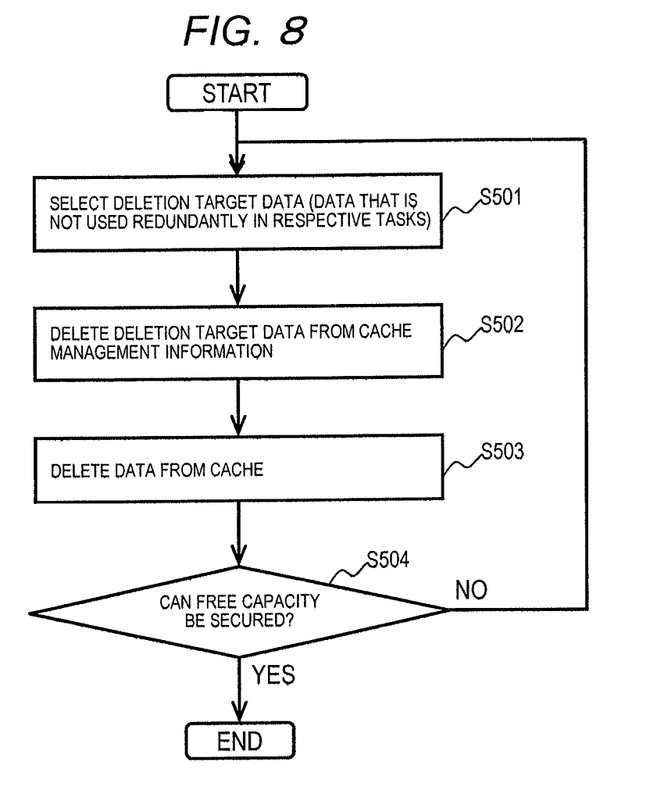
FIG. 8 is a flowchart of in-cache arrangement processing on a cache data unit basis according to the first embodiment.

FIG. 8 is a flowchart of in-cache arrangement processing on a cache data unit basis according to the first embodiment.

First, the cache management module 212 determines cache data to be deleted (delete target cache data) (Step S501). The deletion target cache data may be, for example, data that is not used redundantly by a plurality of tasks, data with a small number of tasks to be used, data with a large data size, or data with a small data size, and can be determined by any method.

Next, the cache management module 212 deletes the deletion target cache data from the cache data list 407 of the cache management information 214 (Step S502), and deletes the deletion target cache data which is present in the cache 215 (Step S503).

Next, the cache management module 212 confirms whether or not a necessary free capacity can be secured in the cache 215 (Step S504). As a result, in a case where it is confirmed that the necessary free capacity cannot be secured (NO in Step S504), the cache management module 212 causes processing to proceed to Step S501 and performs processing to delete the next deletion target cache data. On the other hand, in a case where it is confirmed that the necessary free capacity can be secured (YES in Step S504), the cache management module 212 ends the in-cache arrangement processing on a cache data unit basis.

According to the in-cache arrangement processing on a cache data unit basis, the free capacity of the cache 215 can be adequately secured without inquiring the task management node 100.

As described above, according to the computer system 10 of the first embodiment, since the task processing node 200 to which the task having a high degree of similarity to the new task is allocated is set as the allocation destination of the new task, there is a high possibility that data necessary for executing the new task is present in the cache 215 of the task processing node 200, data can be read from the storage device 203 of the task processing node 200 to the memory 202, or acquiring data from the storage device 203 of another task processing node 200 by inter-node communication is reduced, and the communication amount of inter-node communication can be reduced. In addition, since the communication amount of inter-node communication can be reduced, the time for receiving data can be reduced, the execution time of task processing can be shortened, and the waiting time of the user until the result of the task processing is obtained can be shortened.

Next, a computer system according to a second embodiment of the present invention will be described. In the following description, differences from the computer system according to the first embodiment will be mainly described, and explanation of common points will be omitted or simplified.

Figure 9:
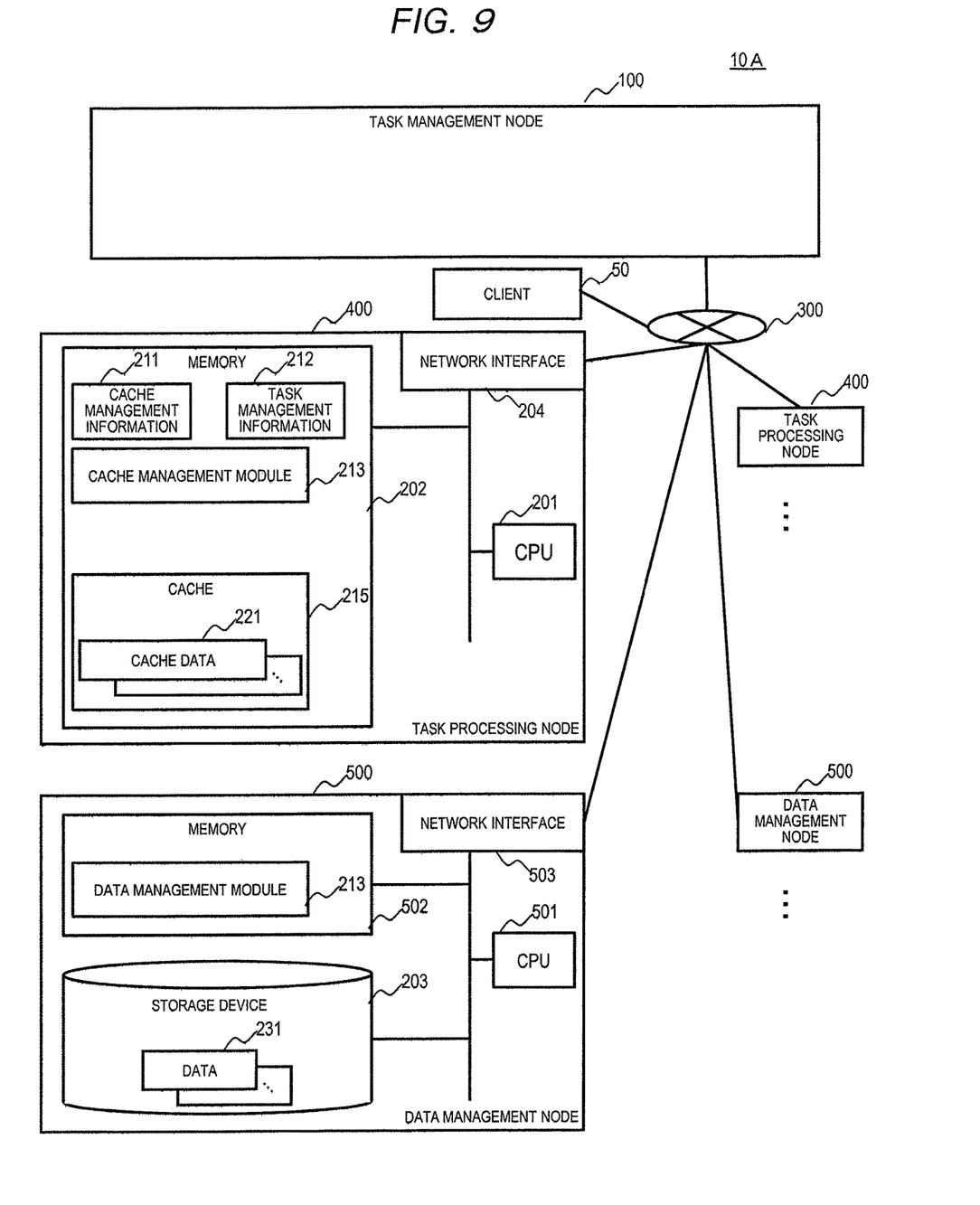
FIG. 9 is an overall configuration diagram of a computer system according to a second embodiment.

FIG. 9 is an overall configuration diagram of a computer system according to a second embodiment.

In a computer system 10A according to the second first embodiment, one or more data management nodes 500 including configurations corresponding to the storage device 203 and the data management module 213 of the task processing node 200 in the computer system 10 according to the first embodiment are made separate from a task processing node 400 and a data management node 500 is connected to the network 300. The task processing node 400 illustrated in FIG. 9 is configured by removing the storage device 203 and the data management module 213 from the task processing node 200 according to the first embodiment, but the present invention is not limited thereto, and the processing node 200 may have the same configuration.

The data management node 500 includes a CPU 501, a memory 502, a storage device 203, and a network interface 503.

For example, the network interface 503 is an interface such as a wired LAN card or a wireless LAN card, and communicates with another device (for example, the client 50, the task management node 100, the task processing node 400, the data management node 500, and the like) via the network 300.

The CPU 501 executes various processing by executing a program (module) stored in a memory 502.

The memory 502 is, for example, a RAM, and stores a program to be executed by the CPU 501 and necessary information.

The memory 502 stores the data management module 213.

The data management module 213 is a program module that causes the CPU 501 to manage a disposition state of the data 231 in the storage device 203 managed by the plurality of data management nodes 500.

In the computer system 10A according to the second embodiment, there are cases where the nodes that execute respective processing are different depending on difference in configuration from the computer system 10, but the same processing as that in FIGS. 4 to 8 can be executed.

According to the second embodiment described above, effects similar to those of the first embodiment can be obtained. Further, according to the second embodiment, since the node (task processing node 400) for performing task processing and cache management and the node (data management node 500) for performing data management are separately provided, for example, since only the task processing node 400 can be expanded or only the data management node 500 can be expanded, necessary performance can be realized at low cost.

The present invention is not limited to the embodiments described above, but can be appropriately modified and implemented without departing from the spirit of the present invention.

For example, in the task management processing according to the embodiments described above, when a node to which a task is to be allocated is determined, as illustrated in steps S102 and S105 in FIG. 4, in a case where a free node is present, the task is allocated to the free node, but the present invention is not limited thereto, and the node to which the task is allocated may be determined for all the nodes regardless of whether or not the free node is present.

In the embodiments described above, the node (task processing node) caching data of the task with the highest degree of similarity is determined as the node to which the task is allocated, but the present invention is not limited thereto. For example, among the nodes whose number of allocated tasks is within a predetermined range, a node caching data of a task having the highest degree of similarity may be determined as the node to which the task is allocated, a node caching data of the task of which the degree of similarity is equal to or greater than a predetermined value may be determined as the node to which the task is allocated. In short, the node to which the task is allocated may be determined based on the degree of similarity.

REFERENCE SIGNS LIST 10, 10A: computer system
100: task management node
101: CPU
102: memory
112: task allocation history information
200, 400: task processing node
201: CPU
202: memory
203: storage device
214: cache management information
215: cache
300: network
500: data management node

The invention claimed is:

1. A task management system comprising:
a plurality of task processing nodes capable of executing a task;
a memory comprising a cache management module configured to determine cache data to be deleted when a cache is in a capacity shortage; and
a task management node determining a task processing node to which a new task is to be allocated,
wherein each of the plurality of task processing nodes includes the memory capable of caching data to be used by an allocation task which is a task allocated to the task processing node,
the task management node stores task allocation information including a correspondence relationship between the allocation task and the task processing node to which the allocation task is allocated and in which data to be used by the allocation task is cached, and
a processor of the task management node
determines a degree of similarity between the new task and the allocation task,
determines a task processing node to which the new task is to be allocated from among the task processing nodes included in the task allocation information based on the degree of similarity, and
allocates the new task to the determined task processing node,
wherein when the cache is in the capacity shortage, the cache management module determines the cached data to be deleted based upon parameters of the cached data, said parameters including cached data that is not used redundantly by a plurality of tasks, cached data with a small number of tasks to be used, cached data with a large data size, or cached data with a small data size,
wherein when the task processing nodes are managed and a plurality of the task processing nodes are free, the task is allocated to a free task processing node having a highest similarity among the plurality of free task processing nodes, and
wherein when the task processing nodes are managed and none of the task processing nodes are free, the task is allocated to the task processing node having the high similarity among all the task processing nodes.

2. The task management system according to claim 1,
wherein the task management node stores an analysis result obtained by analyzing the allocation task using a predetermined analysis method in association with the allocation task, and
the processor of the task management node
analyzes the new task using the predetermined analysis method and
determines the degree of similarity based on an analysis result of the new task and the analysis result of the allocation task.

3. The task management system according to claim 1,
wherein a processor of the task processing node acquires data to be used in the new task allocated to its own task processing node and not cached in the memory from a predetermined storage device and caches the data in the memory.

4. The task management system according to claim 3,
wherein the task processing node stores information on a correspondence relationship between the allocation task and cached data within data to be used in the allocation task, and the processor of the task processing node deletes data that is not being used in a plurality of the allocation tasks from the memory in a case where the free capacity for caching the data acquired from the storage device is not present in the memory.

5. The task management system according to claim 1,
wherein the predetermined storage device is provided in at least one of the plurality of task processing nodes.

6. The task management system according to claim 1,
wherein the predetermined storage device is provided in a data management node that is configured separately from the task processing node.

7. A task management system comprising:
a plurality of task processing nodes capable of executing a task; and
a task management node determining a task processing node to which a new task is to be allocated,
wherein each of the plurality of task processing nodes includes a memory capable of caching data to be used by an allocation task which is a task allocated to the task processing node,
the task management node stores task allocation information including a correspondence relationship between the allocation task and the task processing node to which the allocation task is allocated and in which data to be used by the allocation task is cached, and
a processor of the task management node
determines a degree of similarity between the new task and the allocation task,
determines a task processing node to which the new task is to be allocated from among the task processing nodes included in the task allocation information based on the degree of similarity, and
allocates the new task to the determined task processing node,
wherein the task management node stores an analysis result obtained by analyzing the allocation task using a predetermined analysis method in association with the allocation task, and
the processor of the task management node
analyzes the new task using the predetermined analysis method and
determines the degree of similarity based on an analysis result of the new task and the analysis result of the allocation task, and
wherein the allocation task and the new task are tasks relating to natural language processing, and
the predetermined analysis method is a method of vectorizing words or sentences of the allocation task or the new task.

8. A task management system comprising:
a plurality of task processing nodes capable of executing a task; and
a task management node determining a task processing node to which a new task is to be allocated,
wherein each of the plurality of task processing nodes includes a memory capable of caching data to be used by an allocation task which is a task allocated to the task processing node,
the task management node stores task allocation information including a correspondence relationship between the allocation task and the task processing node to which the allocation task is allocated and in which data to be used by the allocation task is cached, and a processor of the task management node
- determines a degree of similarity between the new task and the allocation task,
- determines a task processing node to which the new task is to be allocated from among the task processing nodes included in the task allocation information based on the degree of similarity, and
- allocates the new task to the determined task processing node, wherein a processor of the task processing node acquires data to be used in the new task allocated to its own task processing node and not cached in the memory from a predetermined storage device and caches the data in the memory, and wherein the task processing node stores information on a correspondence relationship between the allocation task and cached data within data to be used in the allocation task, the processor of the task management node determines a priority order when deleting the cached data for the allocation task according to a predetermined condition and notifies the task processing node of the priority order, and the processor of the task processing node deletes data to be used in the allocation task from the memory according to the priority order in a case where a free capacity for caching the data acquired from the storage device is not present in the memory.

9. The task management system according to claim 8, wherein the processor of the task processing node deletes data to be used in the allocation task and not used in another allocation task from the memory.

10. The task management system according to claim 8, wherein the processor of the task management node determines the priority order based on at least one of a last execution date and time of the allocation task, a degree of similarity between the allocation task and one or more new tasks, a number of times of calculating a degree of similarity with the new task, and the number of times the new task is allocated to an execution node that executed the allocation task.

11. The task management system according to claim 8, wherein the processor of the task management node deletes information for identifying the task processing node that executed the allocation task in a case where all the data to be used in the allocation task is deleted from the memory.

12. A task management method by a task management system which includes:
- a plurality of task processing nodes capable of executing a task;
- a task management node capable of determining a task processing node to which a new task is to be allocated; and
- a processor of the task management node,
- each of the plurality of task processing nodes including a memory capable of caching data to be used by an allocation task which is a task allocated to the task processing node, the task management method comprising:
- storing by the task management node task allocation information including a correspondence relationship between the allocation task and the task processing node to which the allocation task is allocated and in which data to be used by the allocation task is cached;
- storing by the task management node an analysis result obtained by analyzing the allocation task using a predetermined analysis method in association with the allocation task;
- determining by the processor a degree of similarity between the new task and the allocation task;
- determining by the processor a task processing node to which the new task is to be allocated from among the task processing nodes included in the task allocation information based on the degree of similarity;
- allocating by the processor the new task to the determined task processing node;
- analyzing by the processor the new task using the predetermined analysis method; and
- determining by the processor the degree of similarity based on an analysis result of the new task and the analysis result of the allocation task, wherein the allocation task and the new task are tasks relating to natural language processing, and the predetermined analysis method is a method of vectorizing words or sentences of the allocation task or the new task.

* * * * *